(12) United States Patent
Klausmann

(10) Patent No.: US 10,584,816 B2
(45) Date of Patent: Mar. 10, 2020

(54) CLAMPING DEVICE FOR JOINING FLANGE PIECES

(71) Applicant: MTU Aero Engines AG, Munich (DE)

(72) Inventor: Tobias Klausmann, Munich (DE)

(73) Assignee: MTU Aero Engines AG, Munich (DE)

( * ) Notice: Subject to any disclaimer, the term of this patent is extended or adjusted under 35 U.S.C. 154(b) by 610 days.

(21) Appl. No.: 15/155,976

(22) Filed: May 16, 2016

(65) Prior Publication Data

US 2016/0348815 A1 Dec. 1, 2016

(30) Foreign Application Priority Data

May 26, 2015 (DE) .................... 10 2015 209 568

(51) Int. Cl.
| | |
|---|---|
| *F16L 23/036* | (2006.01) |
| *F01D 25/24* | (2006.01) |
| *F16B 5/06* | (2006.01) |
| *F01D 25/26* | (2006.01) |
| *F16B 2/14* | (2006.01) |
| *F16B 35/06* | (2006.01) |

(52) U.S. Cl.
CPC .......... *F16L 23/036* (2013.01); *F01D 25/243* (2013.01); *F16B 5/0635* (2013.01); *F01D 25/265* (2013.01); *F16B 2/14* (2013.01); *F16B 35/06* (2013.01)

(58) Field of Classification Search
CPC ... F16L 23/036; F16L 23/028; F16L 23/0283; F01D 25/243; F16B 2200/50; F16B 2200/509; F16B 7/0426; F16B 2200/503; F16B 2200/506

USPC .......................................... 464/88
See application file for complete search history.

(56) References Cited

U.S. PATENT DOCUMENTS

| | | | | |
|---|---|---|---|---|
| 1,089,859 A | * | 3/1914 | Nutt .................... | F16D 3/74 464/88 |
| 1,160,462 A | * | 11/1915 | Taylor .................. | F16D 3/74 464/88 |
| 3,219,370 A | * | 11/1965 | Ake .................... | F16L 23/026 285/368 |
| 3,744,367 A | * | 7/1973 | Lerich ................ | F16B 13/0891 411/75 |
| 4,243,213 A | * | 1/1981 | Georgian ............ | B25B 1/12 269/137 |
| 4,519,590 A | * | 5/1985 | Wells .................. | B60G 11/113 267/149 |

(Continued)

FOREIGN PATENT DOCUMENTS

| | | |
|---|---|---|
| DE | 19604702 A1 | 8/2000 |
| DE | 10159667 A1 | 6/2003 |

(Continued)

*Primary Examiner* — Matthieu F Setliff
(74) *Attorney, Agent, or Firm* — Barlow, Josephs & Holmes, Ltd.

(57) ABSTRACT

A clamping device for joining two adjacent-lying flange pieces of components is provided herein. The clamping device forms a frame that is equipped for the purpose of being penetrated by the two adjacent-lying flange pieces. The clamping device further includes a tensioning device that is equipped for the purpose of placing under tension or clamping the two adjacent-lying flange pieces in the frame. In addition, the disclosure relates to a flange connection of two components having such a clamping device.

20 Claims, 3 Drawing Sheets

(56) References Cited

U.S. PATENT DOCUMENTS

| | | | | |
|---|---|---|---|---|
| 4,629,084 | A | * | 12/1986 | Hackelsberger ....... B65D 45/18 |
| | | | | 206/508 |
| 6,416,246 | B1 | * | 7/2002 | Boeck .................... F01D 5/066 |
| | | | | 403/337 |
| 7,290,806 | B2 | | 11/2007 | Pichel |
| 2005/0058554 | A1 | * | 3/2005 | Fahrenbach .......... F04D 19/042 |
| | | | | 417/313 |
| 2013/0039749 | A1 | | 2/2013 | Casavant et al. |

FOREIGN PATENT DOCUMENTS

| | | |
|---|---|---|
| DE | 102012007145 A1 | 10/2013 |
| EP | 1010931 A1 | 6/2000 |
| EP | 1995415 A1 | 11/2008 |
| EP | 2096272 A1 | 9/2009 |
| EP | 2336474 A1 | 6/2011 |

\* cited by examiner

CLAMPING DEVICE FOR JOINING FLANGE PIECES

BACKGROUND OF THE INVENTION

The present invention relates to a clamping device for joining two adjacent-lying flange pieces of components, and a flange connection having a clamping device.

Components that are provided as components for the purpose of being assembled with other components are frequently manufactured with flanges. A flange (or flange piece) of a component thus forms a contact surface at which another component can be, for example, screwed, clamped, or fixed by welding, and which serves in many applications also for a transfer of forces and/or for sealing. In particular, the components to be joined may have the same type of flanges, which can be positioned relative to one another and joined together during assembly.

Such flange connections find application in many different fields. For example, with these connections, assembled tubes or casings can be manufactured or different types of elements, such as, e.g., a motor and a casing, can be fastened to each other.

For the most part, flanges used in conventional flange connections have through boreholes. Screws or bolts are passed through these boreholes and placed under tension with nuts. Here, the screws or bolts lie in the flow of operating forces and determine the entire clamping force.

An alternative connection design provides for the clamping of flanges by wedge elements. In this case, a screw or bolt can be used for fixing the wedge element.

For example, the publication DE 10 159 667 A1 discloses a connection device for the separable connection of two components, by which an essentially cylindrical recess of the first of the components and an essentially cylindrical protrusion of the second of the components are placed under tension or clamped together.

A method and a device for aligning an inner turbine casing with respect to an outer turbine casing are known from US 2013/0039749 A1.

The publication DE 196 04 702 discloses a force-fit and form-fit connection arrangement for rotationally symmetrical components, with which a sleeve engages over two abutting flange collars. Wedge-shaped tension elements are pulled into the sleeve by tension bolts. The tension elements are pressed against one of the collars in this way. Depending on the type of components being connected, the positioning and assembly of such a connection arrangement, however, can be complicated and expensive.

According to an embodiment also disclosed in the publication, the sleeve is formed on one of the two components. High bending forces, by which the material is stressed and the connection can be loosened, operate on a sleeve which is integrated in this way into the component and which engages over the adjacent flange of the other component, due to the clamping and with the corresponding use of the joined components.

The same argument applies to a separable connection, which is disclosed in the publication DE 10 2012 007 145 A1, of rotationally symmetrical components comprising a sleeve that axially engages over two adjacent flange collars.

SUMMARY OF THE INVENTION

The object of the present invention is to provide a technique for connecting flange pieces, with which the above-named disadvantages can be surmounted.

The object is achieved by a clamping device and a flange connection of the present invention. Preferred embodiments are disclosed in detail below.

A clamping device according to the present invention serves for joining two adjacent-lying flange pieces of two components, thus for joining a first flange piece of a first component to a second flange piece of a second component, the flange pieces being positioned adjacent to one another. The clamping device forms a frame that is equipped for the purpose of or is suitable for being penetrated by the two adjacent-lying flange pieces; in this way, the frame surrounds the two flange pieces.

In addition, the clamping device has a tensioning device that is equipped for the purpose of clamping or placing under tension the two adjacent-lying flange pieces in the frame.

A flange connection according to the invention joins a first component to a second component. In this case, the first component has at least one first flange piece that abuts a second flange piece of the second component. The first and the second flange pieces penetrate a frame of a clamping device according to the invention.

The first and the second components preferably involve two casing components of a turbomachine, in particular, an aircraft gas turbine or a stationary industrial gas turbine. The two casing components are preferably designed non-segmented in the peripheral direction. Further, in the assembled state of the turbomachine, the two components are preferably disposed concentric to the machine axis of the turbomachine.

In this document, the term "penetrate" is preferably, but not absolutely, to be understood in that the penetrating flange pieces project completely through the frame or must emerge therefrom on one or both sides of the frame. In particular, it refers to a ratio between a frame plane, in which the frame surrounds (i.e., runs around) the flange pieces and a (penetration) direction, in which the two flange pieces project into the frame (thus penetrate the frame): This direction and the frame plane are thus at an angle to each other, preferably essentially disposed perpendicular to one another. A penetration direction of the flange pieces preferably corresponds to a flange direction, i.e., a direction in which the flange pieces protrude from the respective component.

The flange pieces can thus be joined solidly to one another with the help of the surrounding frame by a clamping device according to the invention (or in a flange connection according to the invention), without bending torque being produced. Also, the tensioning device is only tension-loaded. In particular, in the case of connected components that must withstand external loads, such as, for example, effects of lever-like forces, a clamping device according to the invention thus assures a permanently stable connection.

At least in one section, the frame can have a base surface that is provided for the purpose of being disposed facing the joined components or lying on at least one of the components in the clamped state of the clamping device. The base surface can have an outer edge with one or more polygonal (i.e., rectangular) or curved section(s). The base surface preferably lies perpendicular to the flange direction and/or perpendicular to a contact surface of the first and second flange pieces. In particular, the base surface can define a frame plane, in which lies the base surface.

The flange pieces are preferably essentially cuboid or comprise at least one cuboid section.

The first and the second components preferably lie adjacent to one another along a connection edge and the frame crosses the connection edges of the components at least twice when surrounding the flange pieces.

The tensioning device can comprise a screw or bolt and a wedge positionable with the bolt. The wedge in this case is equipped to be driven or pulled by clamping in a tensioning direction; the tensioning direction thus preferably coincides with the axis of the bolt. According to a preferred embodiment, in a clamped state, an inner periphery of the frame has a diameter that is at most three times, preferably at most double, still more preferably at most 1.5 times, or essentially the same size as a diameter of an essentially cylindrically shaped threaded part of a bolt of the tensioning device. These size ratios offer the advantage of a particularly uniform force effect of the tensioning device.

In particular, the tensioning device can have a clamping wedge and a tension bolt, with which the clamping wedge can be pulled through a mount in the clamping device, in order to clamp together or place under tension the two flange pieces.

An embodiment in which the tensioning device comprises a wedge bolt is particularly preferred. In particular, the tensioning device can comprise a threaded wedge bolt and a nut. For example, when the nut is tightened, the wedge of the wedge bolt can be pulled into a housing (e.g., a narrowing housing) and thus the clamping can be produced. In particular, according to this embodiment, the two flange pieces thus can be placed under tension together by tightening the nut or can be separated from one another by loosening the nut. The use of a wedge bolt on which only the nut needs to be screwed for clamping assures a connection and assembly that are particularly simple to produce.

According to a preferred embodiment of a clamping device according to the invention, the tensioning device comprises a wedge having a pressing surface, which is equipped for the purpose of pressing against one of the two adjacent-lying flange pieces when the flange pieces are placed under tension.

Based on the direct engagement on one of the flange pieces, a clamping element having such a tensioning device has a particularly favorable force transfer and thus assures a low-loss clamping.

According to one embodiment of a clamping device according to the invention, such a pressing surface extends in one direction (parallel) to a clamping or tensioning direction of the wedge, thus lies in a plane that has a directional vector in the direction in which the wedge can be pulled or driven for clamping; in one embodiment in which the tensioning element comprises a wedge bolt, the pressing surface thus preferably extends in the direction (parallel to) a bolt axis of the wedge bolt. Its wedge can thus have a one-sided bevel or slope on only one side facing away from the flange pieces.

Such an embodiment may be advantageous, each time depending on the geometric configuration of the two components or their flange pieces that are to be joined. In particular, it permits an alignment of the clamping device, in which a bolt axis of a tension bolt tightening the wedge or a nut screwed onto a wedge bolt is disposed parallel to a flange direction and is thus well accessible, if necessary.

According to a preferred embodiment, the wedge on the side facing the flange pieces is essentially shaped like it is on the side facing away from the flange pieces; for example, a pressing surface can be designed inclined at the same angle as a surface of the wedge facing away from the flange pieces, with respect to a bolt axis (of a wedge bolt that forms the wedge, or of a tension bolt that tightens the wedge). In particular, such a wedge can have a longitudinal section along a bolt axis (of a wedge bolt that forms the wedge, or of a tension bolt that tightens the wedge) that is designed symmetrical to the bolt axis; alternatively or additionally, the wedge can have at least one cross section orthogonal to the bolt axis, this section being point-symmetrical to a point of intersection of the bolt axis; an embodiment in which each such cross section is point-symmetrical in this way (e.g., right-angled, in particular square) is particularly preferred.

Such a similar geometric shape of the wedge on the side facing the flange pieces and on the side facing away from the flange pieces (between which, for example, the bolt axis of the wedge bolt or of the tension bolt can be disposed) makes possible a particularly well-balanced ratio between screwing and clamping forces of the tensioning device. Unequal forces in the clamping will thus be avoided, whereby the clamping can be designed in a particularly solid manner.

According to one embodiment of a flange connection according to the invention, a first flange piece comprises at least one securing projection on a side facing away from the component. In this case, the frame of the clamping device is disposed at least in a segment between the component surface from which projects the first flange piece and the at least one securing projection on the flange piece. This type of securing projection can be designed, for example, as a bridge piece. It prevents the clamping device from slipping off the flange pieces that it has clamped together; it thus serves for securing the flange connection.

According to a preferred embodiment of the present invention, the clamping device comprises a mount with a through-borehole for the tensioning device. For example, a wedge bolt or a tension bolt of the tensioning device can be guided through the mount; in this case, a wedge of the wedge bolt and a nut on the wedge bolt or a wedge tightening the tension bolt and a head of the tension bolt are preferably disposed on different sides of the mount from one another. This type of mount is preferably formed in one piece with the frame. In this way, a particularly good stability of the clamping device can also be assured even with elevated tension of the tensioning device.

Alternatively or additionally, one of the flange pieces in a flange connection according to the invention can have a mount with a through-borehole for the tensioning device. Analogously to the above, for example, a wedge bolt of the tensioning device can be guided through the mount in the flange piece; in this case, a wedge of the wedge bolt and a nut on the wedge bolt or a wedge tightening the tension bolt and a head of the tension bolt are preferably disposed on different sides of the mount from one another.

This type of flange piece is preferably designed at an angle to a first section, which runs through the frame of the clamping device, and a second section, which forms an overhang over the second flange piece and forms the mount for the tensioning device.

In this embodiment, one of the flange pieces is screwed with the clamping device, which signifies a particularly good securing of the flange connection against slipping off the clamping device.

Advantageously, an embodiment in which the first and the second components joined by the flange connection abut one another along a connection edge of the two components, the first and the second components having a plurality of (preferably similar) flange pieces along the connection edge. In each case, the distance between two adjacent flange pieces of the same component here preferably amounts to at most double, preferably at most 1.5 times the dimension of a flange piece along (thus parallel to the direction of) the connection edge; more preferably, the named distance and the named dimension are essentially of the same size. The flange pieces of the first component are each preferably joined to a flange piece of the second component by a clamping device according to one embodiment of the present invention.

The named distances assure a secure and tight connection of the two components, in that sections that are not clamped together have the indicated relatively small dimension when compared to sections that are clamped together. This is particularly advantageous, for example, if the connection of the two components will be sealed against a fluid passage.

BRIEF DESCRIPTION OF THE DRAWING FIGURES

Preferred embodiment examples of the invention will be explained in more detail in the following based on drawings. It is understood that individual elements and components can also be combined differently than what is shown.

Herein, schematically:

DESCRIPTION OF THE INVENTION

Figure 1:
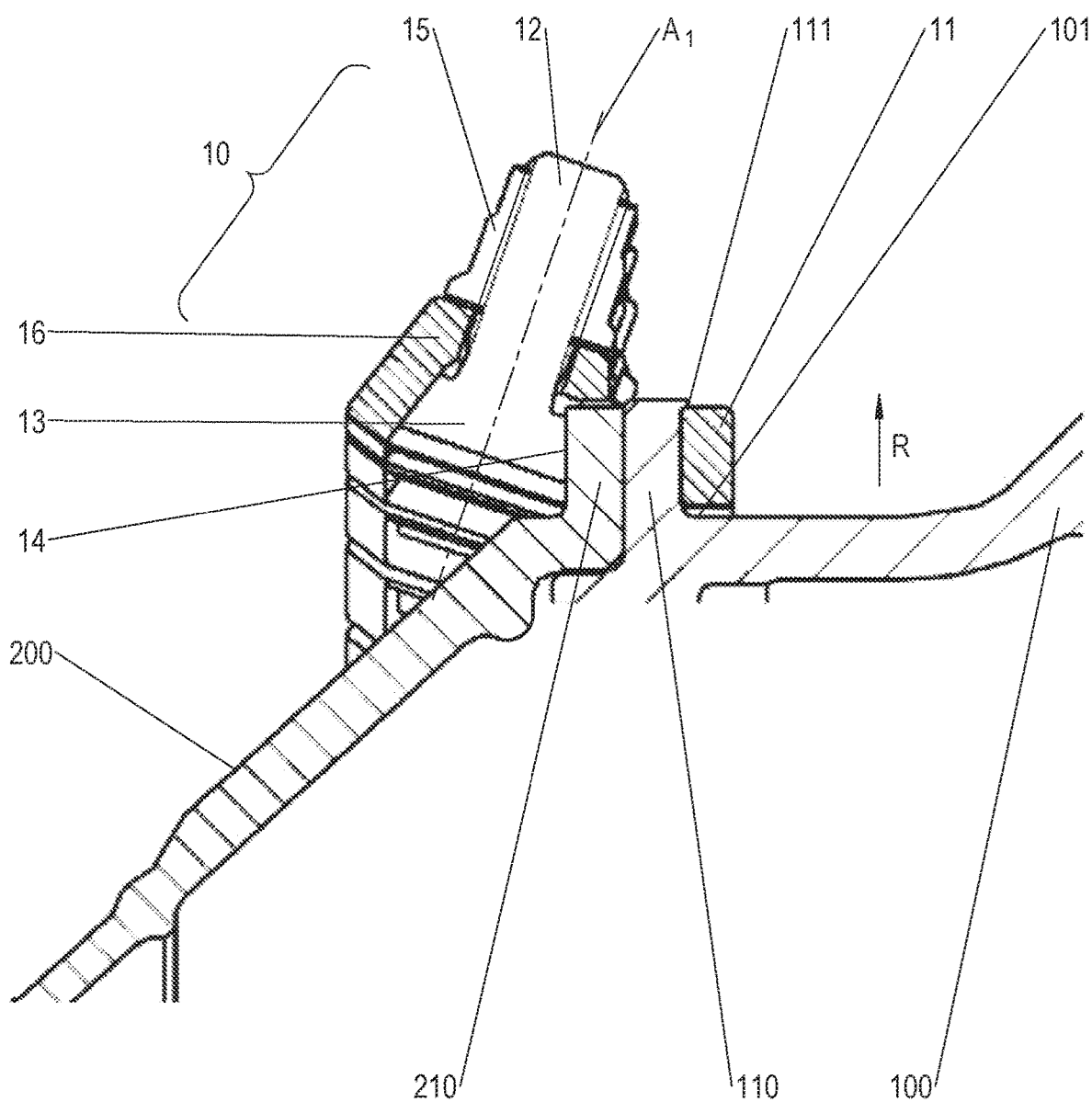
FIG. 1 shows a flange connection with clamping device according to an exemplary embodiment of the present invention.

FIG. 1 shows schematically a flange connection having a plurality of clamping devices according to the present invention, which joins together a first component 100 and a second component 200. For identifying an inner structure of the clamping device, a clamping device 10 that is frontmost in the representation is shown in a longitudinal section.

The components 100, 200 each have (in particular) an essentially cuboid flange piece 110 or 210, which projects from the respective component 100, 200 in a flange direction R. In particular, the flange pieces each have three side surfaces at an angle relative to the respective component and a contact surface, at which the flange pieces 110, 210 are disposed adjacent to one another.

The clamping device 10 is disposed locally in a segment of a connection edge of the first and second components 100, 200, and forms there a frame 11, which surrounds the two adjacent-lying flange pieces 110, 210 in the representation of FIG. 1. Here, it surrounds the side surfaces and contact surface of the flange pieces and crosses the connection edge twice (not shown), namely once in front of and once behind the flange pieces 110, 210 in the perspective shown in FIG. 1.

The two flange pieces 110, 210 penetrate the frame 11; in particular, the frame shown surrounds the two flange pieces along a frame plane that lies essentially perpendicular to the penetration direction of the two flange pieces given by the flange direction R. Also, the frame plane is at an angle relative to a contact surface of the two flange pieces, in the example shown also by 90°.

In addition, the clamping device 10 has a tensioning device that comprises a wedge bolt 12 with wedge 13 as well as a nut 15 in the example shown. The wedge bolt 12 is guided through a through-borehole of a mount 16 of the clamping device 10. The nut 15 tightened on the wedge bolt clamps or places under tension the wedge 13 against the mount. In this case, a pressing surface 14 of the wedge 13 presses against the flange piece 210. In this way, a clamping force that operates in the direction of the surrounded flange piece is exercised.

On a side facing away from the remaining component 100 (thus on a front surface of the flange piece 110), the flange piece 110 has a securing projection 111. The frame is disposed in a segment on the right side in the representation, between a component surface 101 of the component 100 and the securing projection 111 on the flange piece. In this way, the clamping device 10 is secured against slipping out from the adjacent-lying flange pieces.

In the exemplary embodiment shown in FIG. 1, on the side facing the flange pieces (at the right in the figure), the wedge 13 has the same shape as the side facing away from the flange pieces (at the left in the figure); therefore, in the longitudinal section of the wedge bolt shown, the wedge 13 is designed symmetrical relative to the bolt axis $A_1$, which is at an angle relative to the pressing surface 14 (thus does not run in a plane parallel to the pressing surface).

The symmetrical design of the wedge makes possible a balanced ratio of screwing and clamping forces of the tensioning device and thus a particularly solid connection of the two flange pieces 110, 210.

Figure 2:
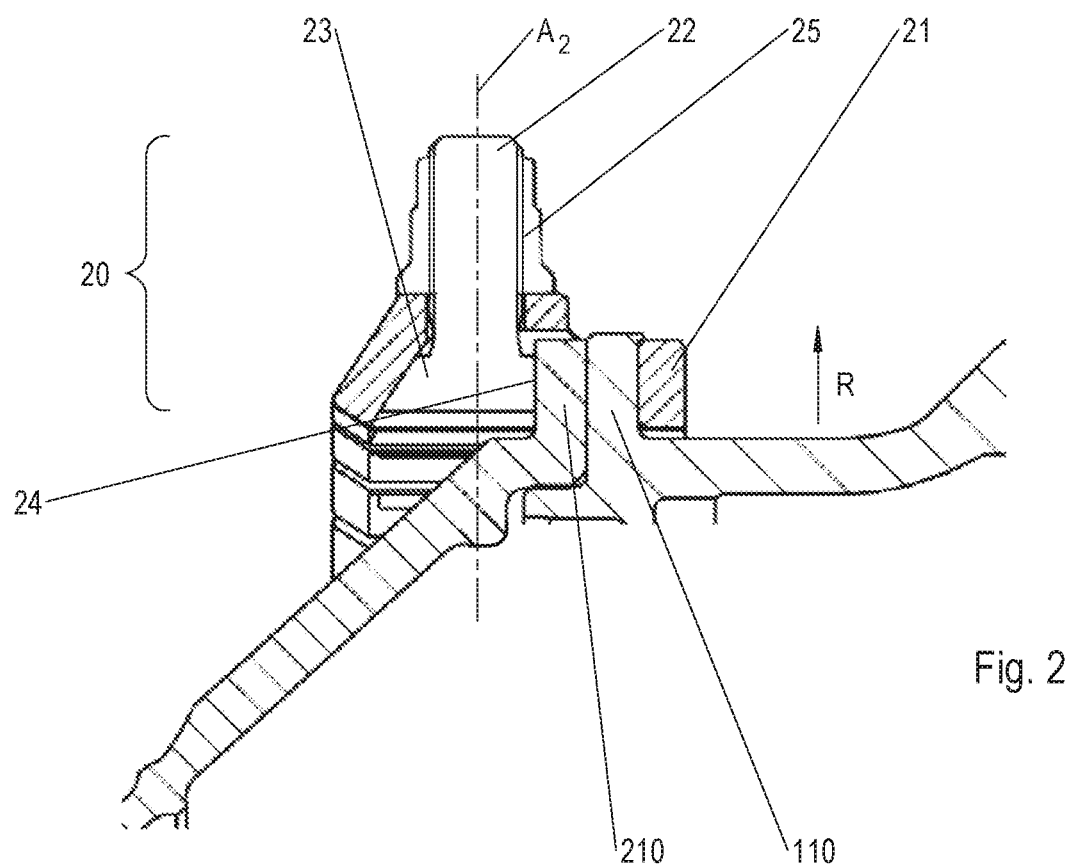
FIG. 2 shows a flange connection with a clamping device according to an alternative embodiment of the present invention.

In FIG. 2, the two flange pieces 110, 210 are joined to an alternative embodiment of a clamping device 20 according to the invention. Analogously to the clamping device 10, the clamping device 20 also forms a frame 21, which surrounds the flange pieces 110, 210, and is thus penetrated by them. The clamping device 20 also has a tensioning device that comprises a wedge bolt 22 and a nut 25. In this case, a pressing surface 24 of the wedge 23 of the wedge bolt 22 presses against the flange piece 210. In the tensioning of the nut on the wedge bolt, its wedge 23 is pulled in a tensioning direction parallel to a bolt axis $A_2$. Therefore, the tensioning direction runs parallel to the pressing surface 24.

Based on this embodiment, it is possible to place the clamping device 20 on the adjacent-lying flange pieces 110, 210, so that the bolt axis $A_2$ runs parallel to the flange direction R. In particular, the clamping device is thus not inclined relative to the flange pieces.

In this way, for example, components, in which an obliquely aligned nut would be problematic due to the geometric configuration of the components, can be joined together.

Figure 3:
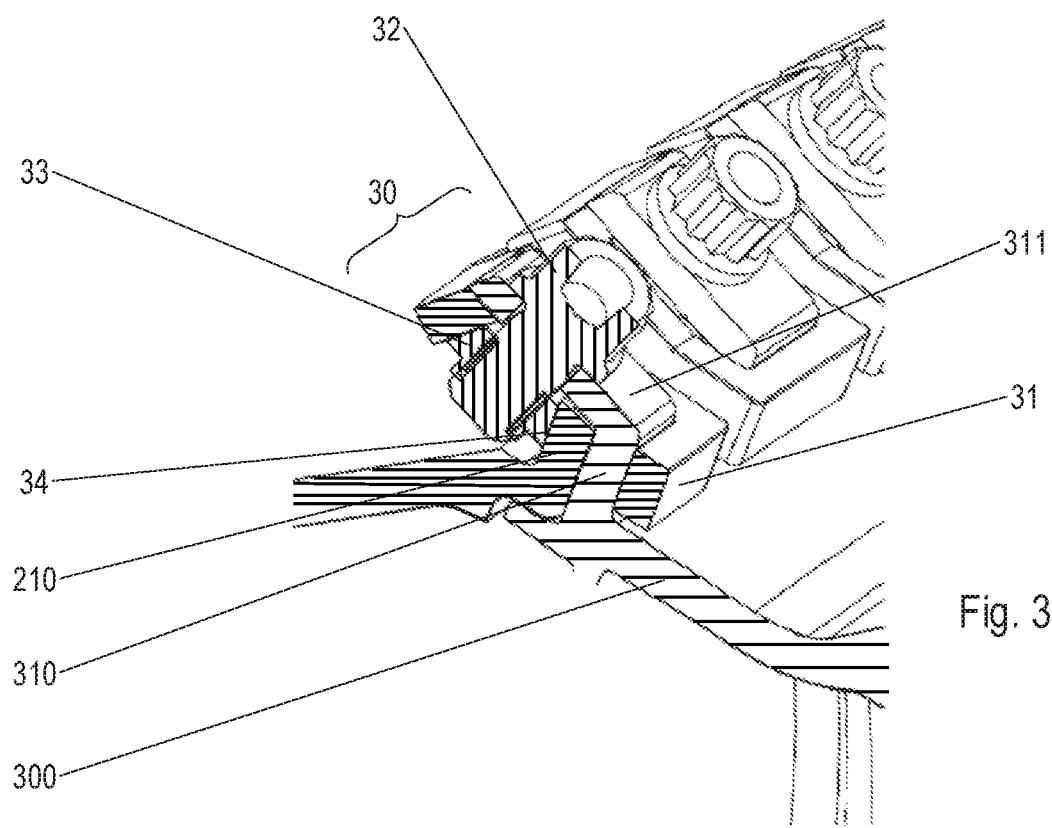
FIG. 3 shows a flange connection with a clamping device according to another alternative embodiment of the present invention.

An alternative flange connection according to an embodiment of the present invention is shown in FIG. 3. The flange piece 210 of the component 200 is joined here to an angled flange piece 310 of a component 300 by a clamping device 30. The clamping device 30 forms a frame 31 that is penetrated by the flange pieces 210 and 310; a base surface of a frame section facing the joined components comprises two parallel, right-angled sections that are joined by a central surface disposed perpendicular to these two sections.

In this way, the frame surrounds the flange piece 210 as well as a first section of the flange piece 310; a second, angled section of the flange piece 310 forms an overhang over the other flange piece 210 and a mount 311 for the tensioning device of the clamping device 30. In the example shown, this tensioning device comprises a tension bolt 32 and a clamping wedge 33, which presses by a pressing surface 34 against the flange piece 210 in the clamped state.

In such an embodiment, the clamping device is particularly well secured against slipping off.

Figure 4:
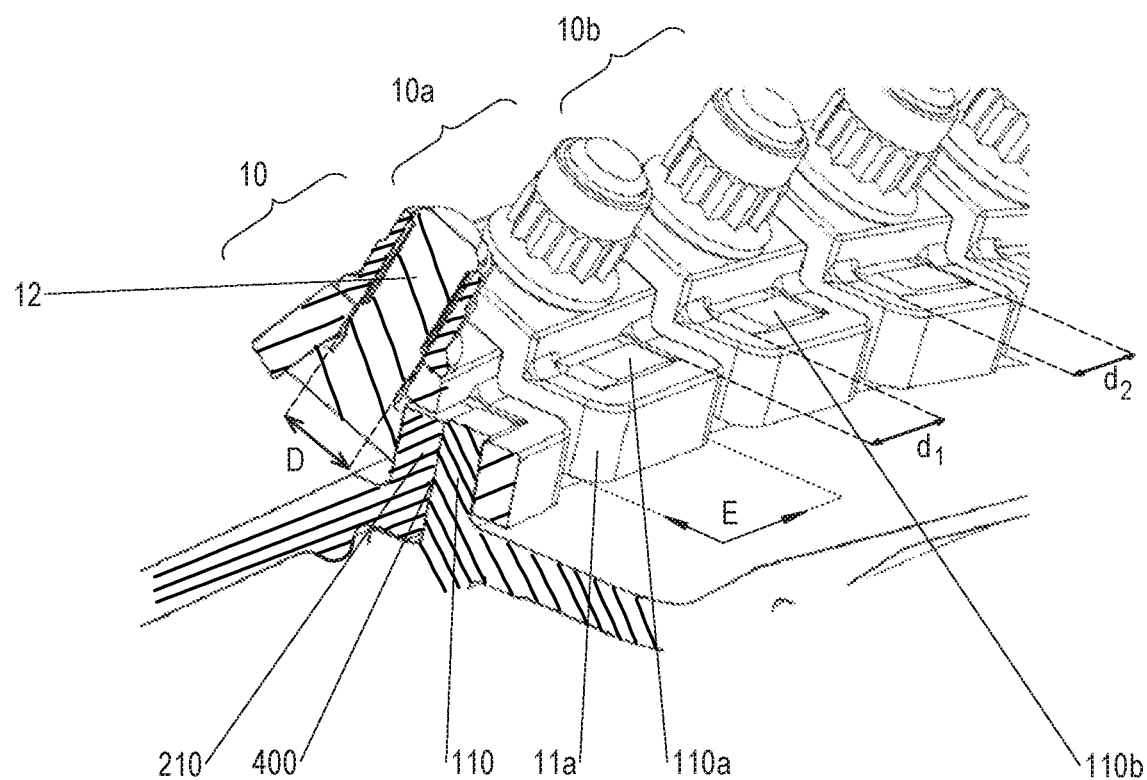
FIG. 4 shows a flange connection according to FIG. 1 in a first perspective view.

A flange connection is shown in a first perspective view in FIG. 4. The flange connection here comprises a plurality of clamping devices 10, 10a, 10b which correspond to the embodiment shown in FIG. 1 and which are disposed next to one another along a connection edge 400 of a first component 100 and a second component 200, these clamping devices each forming a frame 11, 11a.

For example, the frame 11a of the clamping device 10a in this case runs along a frame plane E, which lies perpendicular to a flange direction, in which the flange pieces surrounded by the frame 11a project from the respective component and in which they penetrate the frame. A base surface of a section of the frame, which lies in the frame plane E and which faces the joined components, comprises two parallel, right-angled sections that are joined by a central surface disposed perpendicular to these two sections.

The flange pieces are formed similarly each time in the embodiment shown in FIG. 4. Each of the flange pieces 110, 110a, 110b has a dimension $d_2$ along the connection edge 400 (and in the direction of the connection edge). Adjacent flange pieces 110a, 110b of a component are thus distanced from one another in each case by a distance $d_1$. In this case, $d_1$ is preferably a maximum of double the dimension of $d_2$, but preferably is a maximum of one-and-a-half times as large or essentially the same dimension as $d_2$, as is the case, in particular, in the exemplary embodiment shown in FIG. 4. These distances assure a particularly good tightness of the joined components.

As is also shown in FIG. 4, an essentially cylindrically shaped threaded part of the wedge bolt 12 has a diameter D. The respective dimension $d_2$ of the individual flange pieces 110, 110a, 110b is preferably at most double, but preferably at most 1.5 times the dimension of a diameter of an essentially cylindrically shaped threaded part of a bolt of the tensioning device. These size ratios offer the advantage of a particularly uniform force effect of the tensioning device.

Figure 5:
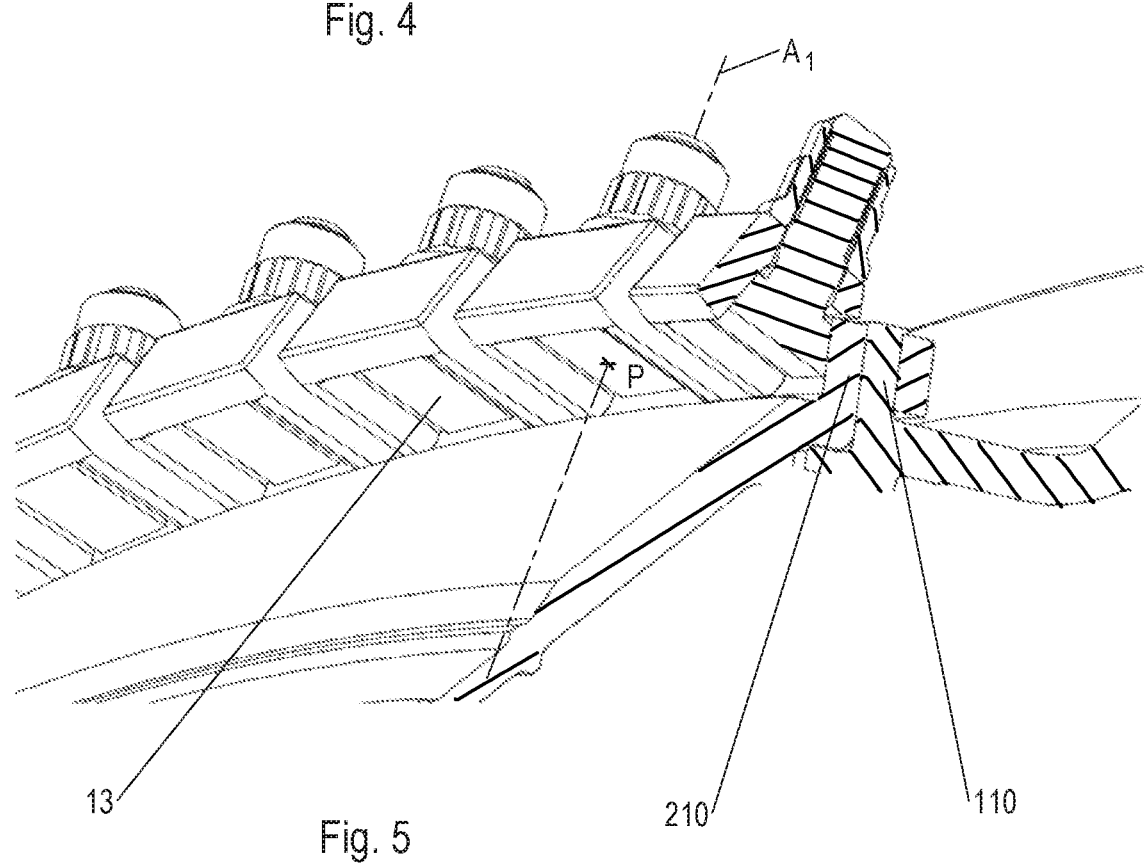
FIG. 5 shows a flange connection according to FIG. 1 in a second perspective view.

The arrangement of FIG. 4 is shown from a different perspective in FIG. 5. As can be seen in the figure, the wedges 13 of the wedge bolt each have a square base surface in the embodiment shown. In this embodiment, in particular, each cross section of the wedge 13 running orthogonal to the bolt axis $A_1$ in one plane is point-symmetrical to a penetration point P of the bolt axis $A_1$.

What is claimed is:

1. A flange connection, comprising:
   a first component having at least one first flange piece;
   a second component having at least one second flange piece, the second flange piece is disposed adjacent to the first flange piece of the first component; and
   a clamping device for joining the first and second adjacent-lying flange pieces of components, comprising:
   a frame arranged around the two adjacent flange pieces; and
   a tensioning device configured and arranged for placing under tension or clamping the two adjacent-lying flange pieces in the frame,
   wherein at least one of the first and second flange pieces extend entirely through the frame from a proximal most face of the frame to a distal most face of the frame, and
   wherein the tensioning device comprises a threaded wedge bolt and a nut.

2. The flange connection according to claim 1, wherein the threaded wedge bolt comprises a wedge having a pressing surface that is configured and arranged for pressing against one flange piece of the two adjacent-lying flange pieces when the flange pieces are placed under tension.

3. The flange connection according to claim 2, wherein the wedge is configured and arranged for being pulled or driven in a tensioning direction during the placing under tension, and wherein the pressing surface extends parallel to the tensioning direction.

4. The flange connection according to claim 2, wherein the wedge is shaped the same on a side facing the flange pieces and on a side facing away from the flange pieces.

5. The flange connection according to claim 1, wherein the frame further includes a mount with through-borehole for receiving the tensioning device.

6. The flange connection according to claim 1, wherein the frame is disposed around at least a segment of one of the first and second flange pieces between a surface of the respective first and second component and a securing protrusion on the respective flange piece.

7. The flange connection according to claim 1, wherein the first flange piece forms a mount for the tensioning device.

8. The flange connection according to claim 1, wherein the first and the second components each have a plurality of flange pieces along a connection edge, wherein a distance between two adjacent flange pieces in each case amounts to a maximum of double a dimension of a flange piece along the connection edge, or corresponds to this dimension.

9. A flange connection, comprising:
   a first component having at least one first flange piece;
   a second component having at least one second flange piece, the second flange piece is disposed adjacent to the first flange piece of the first component; and
   a clamping device for joining the first and second adjacent-lying flange pieces of components, comprising:
   a frame arranged around the two adjacent flange pieces; and
   a tensioning device configured and arranged for placing under tension or clamping the two adjacent-lying flange pieces in the frame,
   wherein at least one of the first and second flange pieces extend entirely through the frame from a proximal most face of the frame to a distal most face of the frame, and
   wherein the frame further includes a mount with through-borehole for receiving the tensioning device.

10. The flange connection according to claim 9, wherein the tensioning device comprises a wedge having a pressing surface that is configured and arranged for pressing against one flange piece of the two adjacent-lying flange pieces when the flange pieces are placed under tension.

11. The flange connection according to claim 10, wherein the wedge is configured and arranged for being pulled or driven in a tensioning direction during the placing under tension, and wherein the pressing surface extends parallel to the tensioning direction.

12. The flange connection according to claim 10, wherein the wedge is shaped the same on a side facing the flange pieces and on a side facing away from the flange pieces.

13. The flange connection according to claim 9, wherein the frame is disposed around at least a segment of one of the first and second flange pieces between a surface of the respective first and second component and a securing protrusion on the respective flange piece.

14. The flange connection according to claim 9, wherein the first and the second components each have a plurality of flange pieces along a connection edge, wherein a distance between two adjacent flange pieces in each case amounts to a maximum of double a dimension of a flange piece along the connection edge, or corresponds to this dimension.

15. A flange connection, comprising:
a first component having at least one first flange piece;
a second component having at least one second flange piece, the second flange piece is disposed adjacent to the first flange piece of the first component; and
a clamping device for joining the first and second adjacent-lying flange pieces of components, comprising:
  a frame arranged around the two adjacent flange pieces; and
  a tensioning device configured and arranged for placing under tension or clamping the two adjacent-lying flange pieces in the frame,
wherein at least one of the first and second flange pieces extend entirely through the frame from a proximal most face of the frame to a distal most face of the frame, and
wherein the first and the second components each have a plurality of flange pieces along a connection edge, wherein a distance between two adjacent flange pieces in each case amounts to a maximum of double a dimension of a flange piece along the connection edge, or corresponds to this dimension.

16. The flange connection according to claim 15, wherein the tensioning device comprises a wedge having a pressing surface that is configured and arranged for pressing against one flange piece of the two adjacent-lying flange pieces when the flange pieces are placed under tension.

17. The flange connection according to claim 16, wherein the wedge is configured and arranged for being pulled or driven in a tensioning direction during the placing under tension, and wherein the pressing surface extends parallel to the tensioning direction.

18. The flange connection according to claim 16, wherein the wedge is shaped the same on a side facing the flange pieces and on a side facing away from the flange pieces.

19. The flange connection according to claim 15, wherein the frame is disposed around at least a segment of one of the first and second flange pieces between a surface of the respective first and second component and a securing protrusion on the respective flange piece.

20. The flange connection according to claim 15, wherein the first flange piece forms a mount for the tensioning device.

* * * * *